(12) United States Patent
Bradford et al.

(10) Patent No.: US 9,688,261 B2
(45) Date of Patent: Jun. 27, 2017

(54) SPRING BRAKE ACTUATOR WITH A CAGING BOLT BEARING JOINING A PRESSURE PLATE AND ACTUATOR TUBE

(75) Inventors: Aaron C. Bradford, Olathe, KS (US); Albert D. Fisher, Kansas City, MO (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 608 days.

(21) Appl. No.: 13/422,355

(22) Filed: Mar. 16, 2012

(65) Prior Publication Data

US 2013/0239799 A1    Sep. 19, 2013

(51) Int. Cl.
    *B60T 17/08*    (2006.01)
(52) U.S. Cl.
    CPC .......... *B60T 17/086* (2013.01); *B60T 17/083* (2013.01)
(58) Field of Classification Search
    CPC ....... B60T 17/08; B60T 17/086; B60T 17/083
    USPC .................................... 92/63, 23, 64, 165 R
    See application file for complete search history.

(56) References Cited

U.S. PATENT DOCUMENTS

| 5,345,858 | A  |   | 9/1994 | Pierce |           |
|-----------|----|---|--------|--------|-----------|
| 2008/0083325 | A1 | * | 4/2008 | Scheckelhoff et al. | ............ 92/63 |
| 2010/0095836 | A1 | * | 4/2010 | Fisher et al. | ....................... 92/63 |

FOREIGN PATENT DOCUMENTS

| EP | 2 177 411 A1 | 4/2010 |  |
|----|--------------|--------|--|
| WO | WO 95/26895 A1 | 10/1995 |  |
| WO | WO 00/30913 A1 | 6/2000 |  |
| WO | WO 01/68429 A1 | 9/2001 |  |
| WO | WO 0168429 A1 * | 9/2001 | ............ B60T 17/083 |

OTHER PUBLICATIONS

European Search Report dated Jul. 26, 2013 issued for co-pending European application 13159284.2. (6 pgs).
Extended European Search Report for related European Application No. 14177130.3 mailed Mar. 11, 2016 (7 pgs).

* cited by examiner

*Primary Examiner* — Eric Keasel
*Assistant Examiner* — Abiy Teka
(74) *Attorney, Agent, or Firm* — Stinson Leonard Street LLP

(57) ABSTRACT

A pneumatic brake actuator has a housing and a divider that divides the housing into a spring chamber containing a spring and a pressure chamber. The divider has an opening that receives an end of an actuator tube. A bearing that is positioned within the opening in the divider is joined to both the divider and the actuator tube. A caging bolt has a first end positioned within the actuator tube and extends from the first end through openings in the hearing and housing to a second end positioned outside of the housing. The connection between the bearing, divider and actuator tube contains the spring within the housing in the event that the housing and/or divider fails. The divider can be a piston or a diaphragm and pressure plate. The bearing can be joined to either of the divider and actuator tube with threads and/or by welding.

32 Claims, 6 Drawing Sheets

SPRING BRAKE ACTUATOR WITH A CAGING BOLT BEARING JOINING A PRESSURE PLATE AND ACTUATOR TUBE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed generally to spring brake actuators, and more specifically to a spring brake actuator with a caging bolt hearing.

2. Description of Related Art

A pneumatic brake system for a large, heavy-duty vehicle such as a bus, truck, semi-tractor, or trailer typically includes a brake shoe and drum assembly which is actuated by an actuator that is operated by the selective application of compressed air. Conventional pneumatic spring brake actuators have both a service brake actuator for actuating the brakes under normal driving conditions by the application of compressed air and a spring-type emergency brake actuator which actuates the brakes when air pressure has been released from a pressure chamber. The emergency brake actuator, or spring brake, includes a strong compression spring which applies the brake when air is released.

There are two main types of pneumatic brake actuators, piston type actuators and diaphragm type actuators. In the diaphragm type brake actuator, two pneumatic diaphragm brake actuators are typically arranged in a tandem configuration, which includes a pneumatic service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. The piston type brake actuator is substantially similar to the diaphragm type, except that instead of a diaphragm, a piston reciprocates in a cylinder for applying the normal and/or parking brakes of the vehicle.

In a typical service brake actuator, the service brake housing is divided into a pressure chamber and a pushrod chamber. The pressure chamber is fluidly connected to a source of pressurized air and the pushrod chamber mounts a pushrod that is coupled to the brake assembly. The introduction and exhaustion of pressurized air in to and out of the pressurized chamber reciprocates the pushrod in to and out of the housing to apply and release the operating brakes.

In a typical spring brake actuator, the spring brake section is divided into a pressure chamber and a spring chamber by a diaphragm. A pressure plate is positioned in the spring chamber between the diaphragm and a strong compression spring, whose opposing end abuts the housing of the section. In one well-known configuration, an actuator tube extends through the pressure plate, through the diaphragm, into the pressure chamber, and through a dividing wall separating the spring brake actuator from the service brake actuator. The end of the actuator tube is fluidly connected to the pressure chamber of the service brake actuator.

When applying the parking brakes, the spring brake actuator pressure is discharged from the pressure chamber and the large force compression spring pushes the pressure plate and the diaphragm toward the dividing wall between the spring brake actuator and the service brake actuator. In this position, the actuator tube connected to the pressure plate is pushed for applying the parking or emergency brakes and thus immobilizing the vehicle. To release the parking brake, pressurized air is introduced into the pressure chamber of the spring brake actuator to expand the pressure chamber, move the diaphragm and pressure plate toward the opposing end of the spring brake actuator housing, and compress the compression spring.

A caging bolt or tool is used to cage the strong compression spring when, for example, the brake must be manually released. It is known to permanently install a caging bolt in a brake actuator. In one such actuator, a threaded bolt extends through a threaded opening in the actuator housing and into a hollow interior of the spring brake actuator tube, which is affixed to the pressure plate. As the emergency brake or parking brake is applied, the pressure plate and actuator tube reciprocate relative to the bolt. This reciprocation over time causes the threads of the bolt to wear. To prevent damage to the caging bolt threads, a bearing is typically positioned within the pressure plate around the caging bolt. The bearing allows the pressure plate and actuator tube to reciprocate relatively smoothly with respect to the caging bolt. Conventionally, the bearing is positioned within an opening in the pressure plate and retained there by the actuator tube which is press fit into the pressure plate opening. The bearing may also be bonded to the pressure plate.

BRIEF SUMMARY OF THE INVENTION

The present invention is directed toward a pneumatic brake actuator having a housing and a divider that divides the housing into a spring chamber and a pressure chamber. A spring is positioned in the spring chamber. The divider presents an opening surrounded by an interior surface, and an end of an actuator tube is positioned within the opening. A bearing is also positioned within the opening in the divider. The bearing is joined to both the divider and the actuator tube. A caging bolt has a first end that is positioned within the actuator tube. The caging bolt extends from its first end through openings in the bearing and housing to a second end that is positioned outside of the housing. The construction of the actuator is advantageous because in the event that the housing side wall or divider fails, the spring is contained within the housing due to the bearing being joined to both the divider and the actuator tube.

In one embodiment, the brake actuator is a piston spring brake actuator, in which case the divider is a piston that sealingly engages the side wall of the housing. In another embodiment, the actuator is a diaphragm spring brake actuator, in which case the divider includes a diaphragm with a peripheral edge that engages the side wall of the housing and a pressure plate that is positioned between the diaphragm and the spring.

Preferably, the bearing has an outer surface and an inner surface that surrounds the opening in the bearing. The actuator tube side wall preferably also has inner and outer surfaces. Preferably, the outer surface of the bearing is joined to the interior surface of the divider and the inner surface of the actuator tube. In one embodiment, the outer surface of the bearing has threads that engage threads on both the interior surface of the divider and the inner surface of the actuator tube. Alternatively, the outer surface of the bearing may have threads that engage threads on the interior surface of the divider, and the outer surface of the bearing is welded to the inner surface of the actuator tube. In another embodiment, the outer surface of the bearing may be welded to the interior surface of the divider and the inner surface of the actuator tube.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
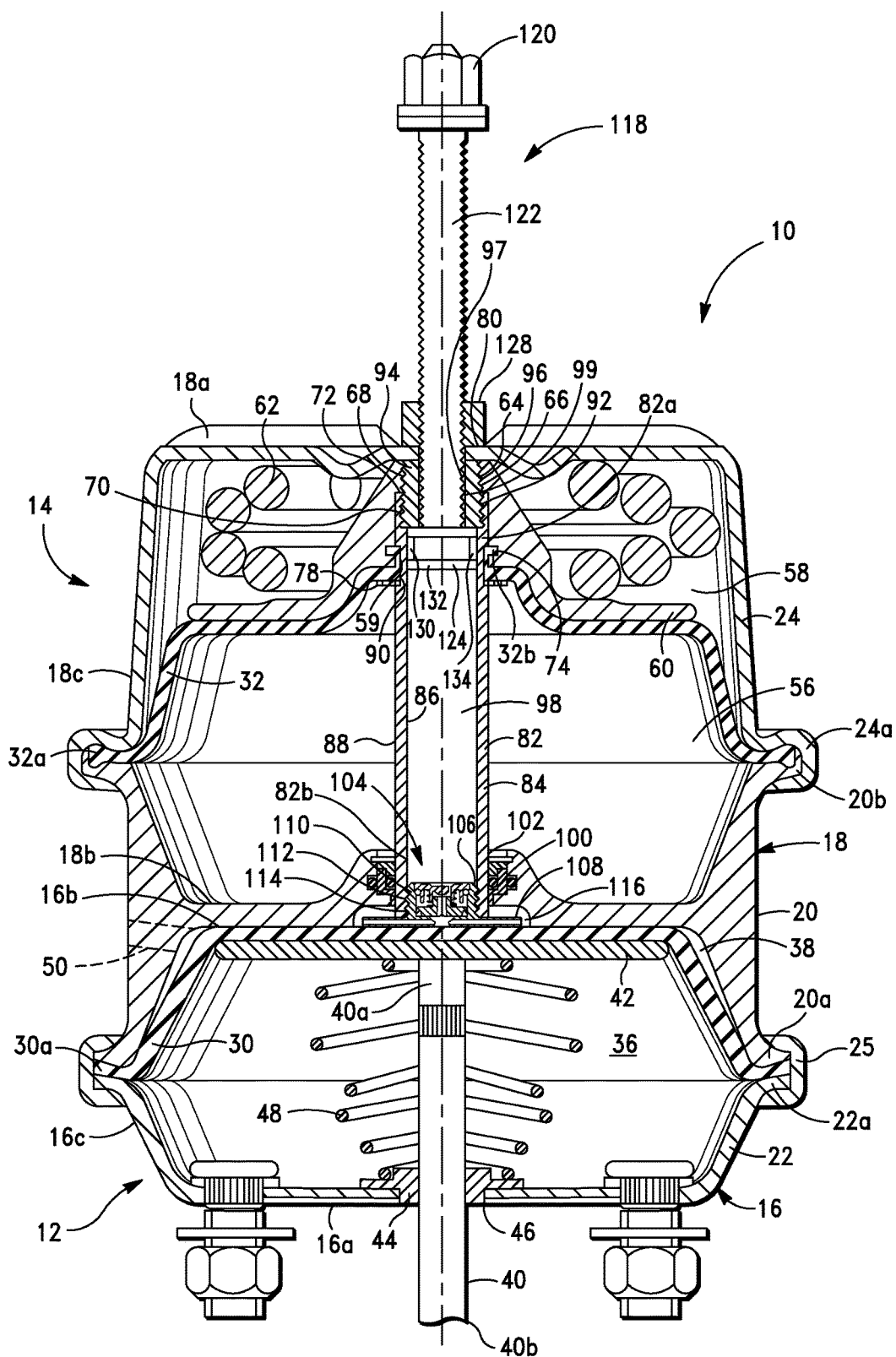
FIG. 1 is a cross-sectional view of a pneumatic brake actuator having spring and service brake actuators where a caging bolt is shown retracting a spring of the spring brake actuator.

FIGS. 1-4 show a tandem-type pneumatic brake actuator 10 comprising a service brake actuator 12 in combination with a spring brake actuator 14. The service brake actuator 12 applies and releases the service or operating brakes of a vehicle. The spring brake actuator 14 is used to apply the emergency or parking brakes of the vehicle.

The service brake actuator 12 includes a housing 16 having first and second end walls 16a and 16b and a side wall 16c that is joined with and extends between the end walls 16a and 16b. The spring brake actuator 14 includes a sealed housing 18 having first and second end walls 18a and 18b and a side wall 18c that is joined with and extends between the end walls 18a and 18b. The housings 16 and 18 are formed by an adapter housing 20 that is coupled with a service brake cover 22 and a spring brake cover 24. The adapter housing 20 and service brake cover 22 have mating flanges 20a and 22a, respectively, that are clamped together with a clamp 25 to secure the service brake cover 22 to the adapter housing 20. The adapter housing 20 has another flange 20b that is clamped by a C-shaped rolled rim 24a of spring brake cover 24 to secure the spring brake cover 24 to the adapter housing 20. The adapter housing 20 defines a common dividing wall separating the service brake housing 16 from the spring brake housing 18 while forming a portion of each housing 16 and 18 such that the second end walls 16b and 18b are integral. It is within the scope of the invention for the adapter housing 20 to be replaced with discrete cover elements similar to the service brake cover 22 and the spring brake cover 24.

Movable members, which in this embodiment include elastomeric diaphragms 30 and 32, span the interior of the service and spring brake housings 16 and 18, respectively. Diaphragm 30 has a peripheral edge 30a that is sealingly clamped between the mating flanges 20a and 22a of the adapter housing 20 and service brake cover 22, respectively. Diaphragm 32 has a peripheral edge 32a that is sealingly clamped between the flange 20b of adapter housing 20 and the rolled rim 24a of spring brake cover 24. A piston-type brake actuator, such as the actuator shown in FIG. 6 and described below which has a piston that spans the interior of a cylindrical spring brake housing instead of a diaphragm, is also within the scope of the present invention.

Referring to the service brake actuator 12, the diaphragm 30 fluidly divides the service brake actuator 12 into a pushrod chamber 36 and a service brake pressure chamber 38. A pushrod 40 has a first end 40a that is positioned within the pushrod chamber 36 and a second end 40b positioned outside of the service brake housing 16. A pressure plate 42 is joined to the first end 40a of the pushrod 40 and abuts diaphragm 30. The pushrod 40 extends from its first end 40a to its second end 40b through a bearing 44 disposed in an opening 46 in the service brake cover 22. A return spring 48 is positioned between the bearing 44 and the pressure plate 42 to aid in biasing the pressure plate 42 and pushrod 40 toward the second end wall 16b of the service brake housing 16. Although not shown, in an S-cam brake assembly, the end 40b of the pushrod 40 is coupled to a slack adjuster of an S-cam brake assembly whereby the reciprocation of the pushrod 40 relative to the service brake housing 16 results in the application and release of the service brakes.

The service brake pressure chamber 38 is fluidly connected to a source of pressurized air through an inlet port 50. As the operator of the vehicle applies the brake pedal, pressurized air is introduced into the service brake pressure chamber 38 through the inlet port 50 to reciprocate the pushrod 40. As the operator of the vehicle releases the brake pedal, the pressurized air is exhausted from the service brake pressure chamber 38 through the inlet port 50. The addition of pressurized air into the service brake pressure chamber 38 moves the diaphragm 30, pressure plate 42 and pushrod 40 away from the second end wall 16b toward the first end wall 16a to apply the service brakes.

Referring to the spring brake actuator 14, the diaphragm 32 fluidly divides the spring brake housing 18 into a spring brake pressure chamber 56 and spring chamber 58. The diaphragm extends from its peripheral edge 32a to an interior, radial edge 32b that surrounds an opening 59 in the diaphragm. The spring brake pressure chamber 56 is fluidly connected to a source of pressurized air through a port (not shown) that is substantially identical to port 50. Typically, the pressure chamber 56 is supplied by a pressurized air system that is physically distinct from the pressurized air system supplying the service brake actuator 12. The spring chamber 58 is sealed to protect the components therein from direct exposure to the atmosphere and common environmental contaminants.

Figure 5:
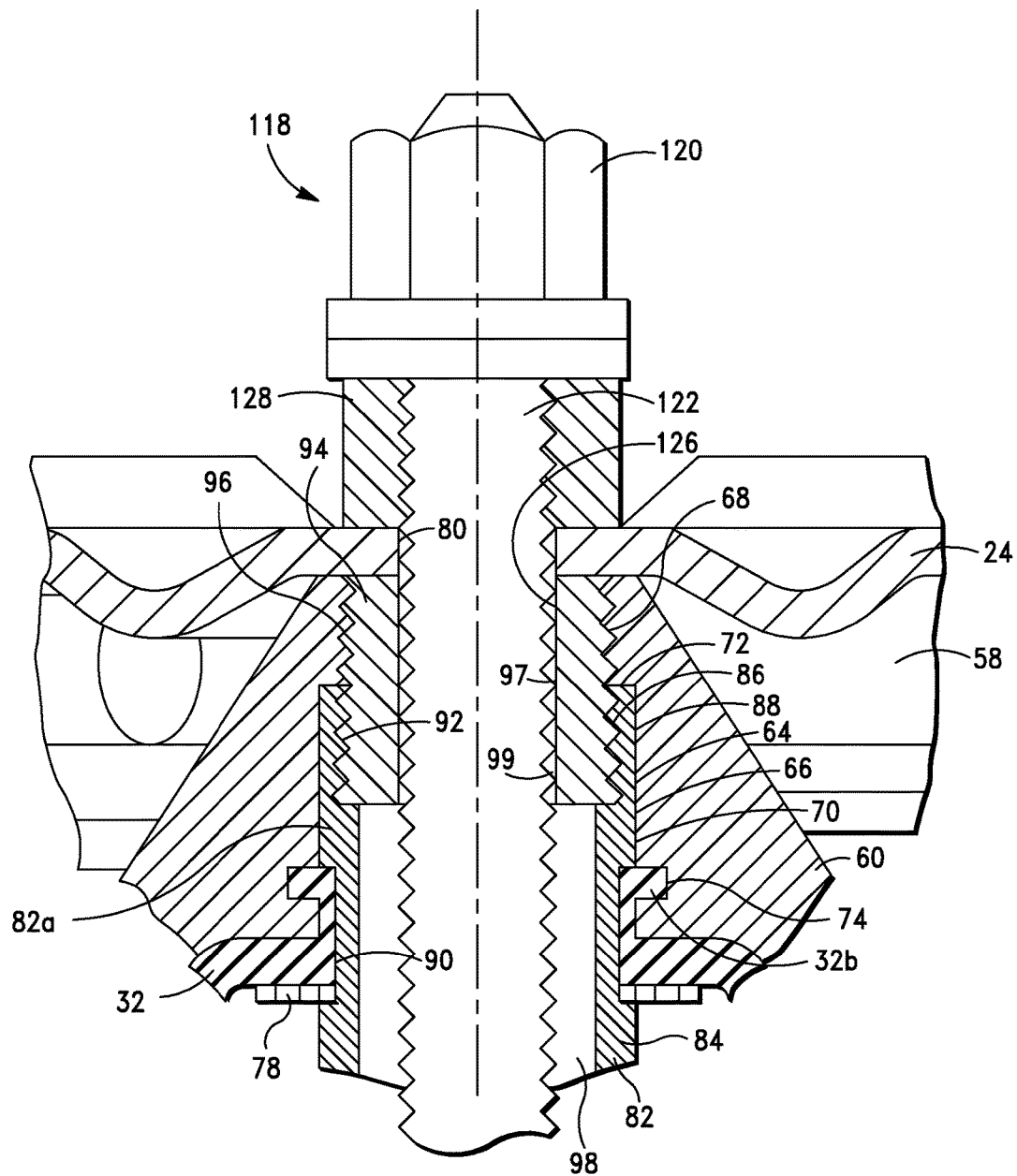
FIG. 5 is a detail view of a caging bolt bearing of the brake actuator of FIG. 1.

A pressure plate 60 is positioned in the spring chamber 58 adjacent to the diaphragm 32. A large force compression spring 62 is placed between the pressure plate 60 and the spring brake cover 24. As shown best in FIG. 5, the pressure plate 60 includes an axial opening 64 surrounded by an interior surface 66 that includes a threaded portion 68, a non-threaded portion 70, and an actuator tube shoulder 72 between the two portions 68 and 70. An annular groove 74 that is formed in the non-threaded portion 70 receives the interior edge 32b of the diaphragm 32. A retaining ring 78 secures the diaphragm 32 to the pressure plate 60. It is within the scope of the invention for the actuator to not have retaining ring 78 such that the groove 74 and configuration of the interior edge 32b of the diaphragm 32 secures the diaphragm 32 to the pressure plate 60. There is an opening 80 in the spring brake cover 24 that is aligned with the opening 64 through pressure plate 60.

A hollow actuator tube 82 has a first end 82a that is press fit within the axial opening 64 and abuts the actuator tube shoulder 72 and a second end 82b (FIG. 1) which is positioned in the service brake pressure chamber 38. The actuator tube 82 has a side wall 84 with inner and outer surfaces 86 and 88, respectively. The outer surface 88 includes a recessed portion 90 that receives a portion of the interior edge 32b of the diaphragm 32 and the optional retaining ring 78. A portion of the outer surface 88 abuts the non-threaded portion 70 of the pressure plate 60. The inner surface 86 includes a threaded portion 92 that is aligned with the threaded portion 68 of the pressure plate 60.

An annular bearing or flange guide 94 has a threaded outer surface 96 that engages the threaded portion 92 of actuator tube 82 and the threaded portion 68 of pressure plate 60 thereby joining the bearing 94, actuator tube 82, and pressure plate 60. It is within the scope of the invention for the bearing 94 to be bonded to the actuator tube 82 and pressure plate 60 in addition to or instead of being joined with threads. In one embodiment, the outer surface 96 of the bearing 94 has a threaded portion that engages the threaded portion 68 on pressure plate 60 and the bearing 94 has a non-threaded portion that is welded to the inner surface 86 of the actuator tube 82. In another embodiment, the entire outer surface 96 of the bearing 94 is not threaded and is welded to both the interior surface 66 of the pressure plate 60 and to the inner surface 86 of the actuator tube 82.

The bearing 94 has a smooth inner surface 97 surrounding an opening 99. The bearing 94 and the pressure plate 60 define therein air passage ways or clearances (not shown) to allow air flow back and forth between the spring chamber 58 and the interior space 98 enclosed by the side wall 84 of the hollow actuator tube 82. Thus, spring chamber 58 is in fluid communication with the interior space 98 of the actuator tube 82.

The actuator tube 82 extends from its first end 82a, which is positioned in the spring chamber 58, through a bearing and seal assembly 100 disposed within an opening 102 formed in the adapter housing 20 to its second end 82b, which is positioned in the service brake pressure chamber 38. The bearing and seal assembly 100 are well known in the art and thus are not described in more detail herein.

Referring to FIG. 1, a control valve 104 is joined to and closes the second end 82b of the actuator tube 82 opposite the pressure plate 60 for regulating fluid flow between spring chamber 58 and service brake pressure chamber 38. The control valve 104 includes a valve body 106 having a transfer plate 108 that is joined to a cylindrical protrusion 110. The cylindrical protrusion 110 has a threaded side wall 112 that engages threads 114 on the inner surface 86 of the side wall 88 of the actuator tube 82. The protrusion 110 is at least partially positioned within the interior space 98 of the actuator tube 82. A seal is formed between the threaded side wall 112 of the control valve 104 and the side wall 88 of the actuator tube 82 to prevent fluid from flowing between the two. Seal structure, such as an o-ring seal, may be positioned between the side wall 112 of the control valve 104 and the side wall 88 of the actuator tube 82 to form the seal. Alternatively, or in addition to using seal structure, such as an o-ring seal, a liquid sealant may be applied to the threaded side wall 112 before the control valve 104 is threaded within the actuator tube 82. The liquid sealant would subsequently harden to form a seal between the control valve 104 and actuator tube 82. The transfer plate 108 is preferably sized to be received within a recess 116 in the adapter housing 20.

The control valve 104 is normally biased to an open position, in which fluid can flow between spring chamber 58 and service brake pressure chamber 38, and moves from its open position to a closed position when the pressure in service brake pressure chamber 38 increases to a threshold level. When the control valve 104 is in its closed position, fluid cannot flow between service brake pressure chamber 38 and spring chamber 58 so that pressure chamber 38 can be pressurized to activate the service brake actuator 12 without undesirably pressurizing the spring chamber 58. Preferably, the control valve 104 is a pilot operated valve with the pilot pressure operating the valve being the pressure in the service brake pressure chamber 38. Therefore, valve 104 will close when the pressure in service brake pressure chamber 38 reaches a threshold level no matter how slowly the pressure in pressure chamber 38 rises.

The brake actuator 10 further comprises a caging bolt assembly 118 comprising an adjustment nut 120 threaded onto and permanently affixed to one end of a caging bolt 122 which terminates at its other end in a caging bolt head 124. The caging bolt head 124 and a portion of the caging bolt 122 extending from the head 124 are positioned within the interior space 98 of the actuator tube 82. The caging bolt 122 extends through the opening 99 of the bearing 94 and through the opening 80 in the spring brake cover 24. The caging bolt 122 is threaded through a cap or collar 128, which is riveted and permanently affixed to the spring brake cover 24 in a substantially sealed manner so that air cannot pass through opening 80. Since the nut 120 and caging bolt head 124 are greater in diameter than the diameter of the opening 99 in bearing 94, the caging bolt 122 couples the pressure plate 60 to the spring brake cover 24 via the connection between the bearing 94 and pressure plate 60 and the connections between the caging bolt 122, collar 128, and spring brake cover 24.

The caging bolt head 124 preferably includes a bearing 130 positioned between opposing collars 132. The bearing 130 contacts the inner surface 86 of the actuator tube 82 to prevent the collars 132 and caging bolt 122 from contacting the inner surface 86 while helping to guide the reciprocal movement of the actuator tube 82 during the application and release of the emergency brakes. Axial slots 134 are formed in the face of the bearing 130 to form a fluid flow path around the bearing 130 so that the spring chamber 58 is in fluid communication with the entire interior space 98 enclosed by the actuator tube 82.

The caging bolt assembly 118 is operable to mechanically retract and hold the large force compression spring 62 in a compressed state (as shown in FIG. 1). By engaging the adjustment nut 120 with a wrench or socket and rotating the nut 120, it is possible to threadably withdraw the majority of the caging bolt 122 out of the spring brake housing 24 from the position shown in FIG. 4 to the position shown in FIG. 1. As the caging bolt 122 is withdrawn, the caging bolt head 124 contacts the bearing 94 at the upper end 82a of the actuator tube 82 to move the bearing 94, actuator tube 82, and pressure plate 60 toward the end wall 18a of the spring brake housing 18 thereby compressing the spring 62. Caging the large force compression spring 62 in this manner, as shown in FIG. 1, is well known and is typically utilized during assembly of the brake actuator 10 and/or for the mechanical release of the brakes in the case of a failure or absence of the compressed air system. When the brake actuator 10 is in active use on a moving vehicle, the caging bolt 122 is moved to the position shown in FIGS. 2-3.

In the event that the rolled rim 24a of the spring brake cover 24, adapter housing flange 20b, and/or pressure plate 60 fails, the spring 62 will remain contained between the adapter housing 20 and spring brake cover 24 because bearing 94 is joined to both the actuator tube 82 and the pressure plate 60. If the rolled rim 24a and/or adapter housing flange 20b fails, then the spring brake pressure chamber 56 evacuates thereby releasing spring 62. The spring 62 exerts pressure on pressure plate 60 and actuator tube 82 which forces the adapter housing 20 away from the spring brake cover 24 and causes the bearing 94 to make contact with caging bolt head 124. The spring 62 remains contained between the pressure plate 60 and spring brake cover 24 due to the connection between the pressure plate 60, actuator tube 82, and bearing 94, the contact between the caging bolt head 124 and bearing 94, and the connection between the caging bolt 122 and spring brake cover 24. If releasing the spring 62 causes the pressure plate 60 to fail in addition to failure of the rolled rim 24a and/or adapter housing flange 20b, then the spring 62 expands between the spring brake cover 24 and adapter housing 20. The transfer plate 108 of the control valve 104 abuts the end wall 16b of the service brake housing 16 due to the pressure exerted on adapter housing 20 by spring 62. The spring 62 remains contained between the spring brake cover 24 and adapter housing 20 due to the connection between the bearing 94 and actuator tube 82, the contact between the transfer plate 108 and end wall 16b, the contact between the caging bolt head 124 and bearing 94, and the connection between the caging bolt 122 and spring brake cover 24.

Figure 6:
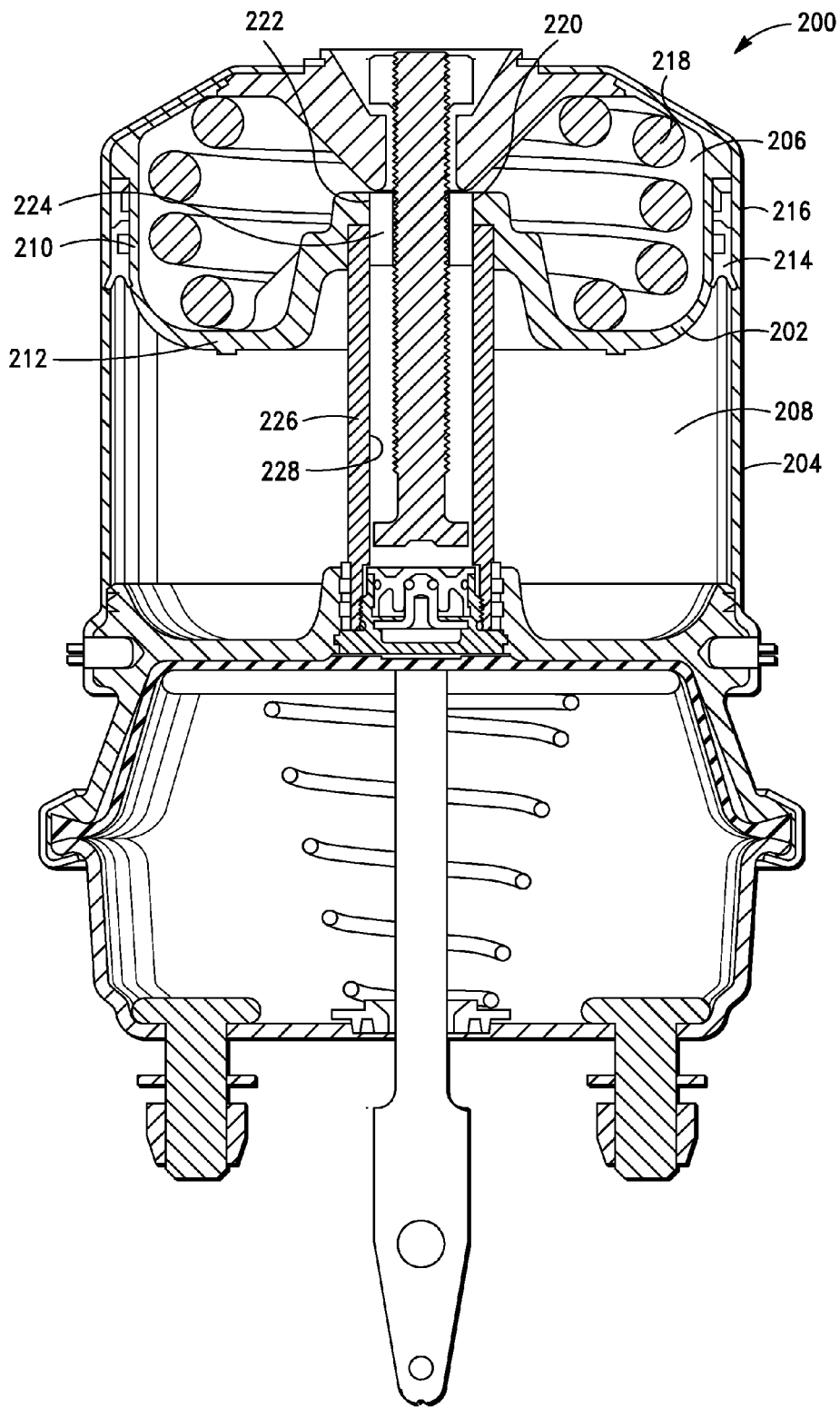
FIG. 6 is a cross-sectional view of an alternative embodiment of brake actuator in accordance with the present invention.

FIG. 6 shows an alternative embodiment of brake actuator 200 in accordance with the present invention. Brake actuator 200 is substantially similar to brake actuator 10. Accordingly, only the differences between the two are discussed in detail herein. The main difference is that brake actuator 200 has a piston 202 instead of the diaphragm 32 and pressure plate 60 of actuator 10. The piston 202 separates a spring brake housing 204 of the actuator 200 into a spring chamber 206 and a spring brake pressure chamber 208. The piston 202 has a side wall 210 that is integral with an end wall 212. A seal 214 is coupled to the side wall 210 and engages a side wall 216 of the spring brake housing 204 to seal the spring chamber 206 from the spring brake pressure chamber 208. A spring 218 is positioned between the piston 202 and spring brake housing 204. The end wall 212 of the piston 202 includes a central opening 220 surrounded by an interior surface 222. The interior surface 222 is joined to the outer surface of a bearing 224. An actuator tube 226 abuts the end wall 212 of the piston 202 and has an inner surface 228 that aligns with the interior surface 222 of the piston 202. The inner surface 228 of the actuator tube 226 is joined to the outer surface of the bearing 224. The outer surface of the bearing 224 is welded to the interior surface 222 of the piston 202 and the inner surface 228 of the actuator tube 226. The bearing 224 may also be joined to the piston 202 and actuator tube 226 in any of the same ways described above for bearing 94. For example, the outer surface of the bearing 224 may have threads that engage threads on the piston 202 and actuator tube 226.

Figure 2:
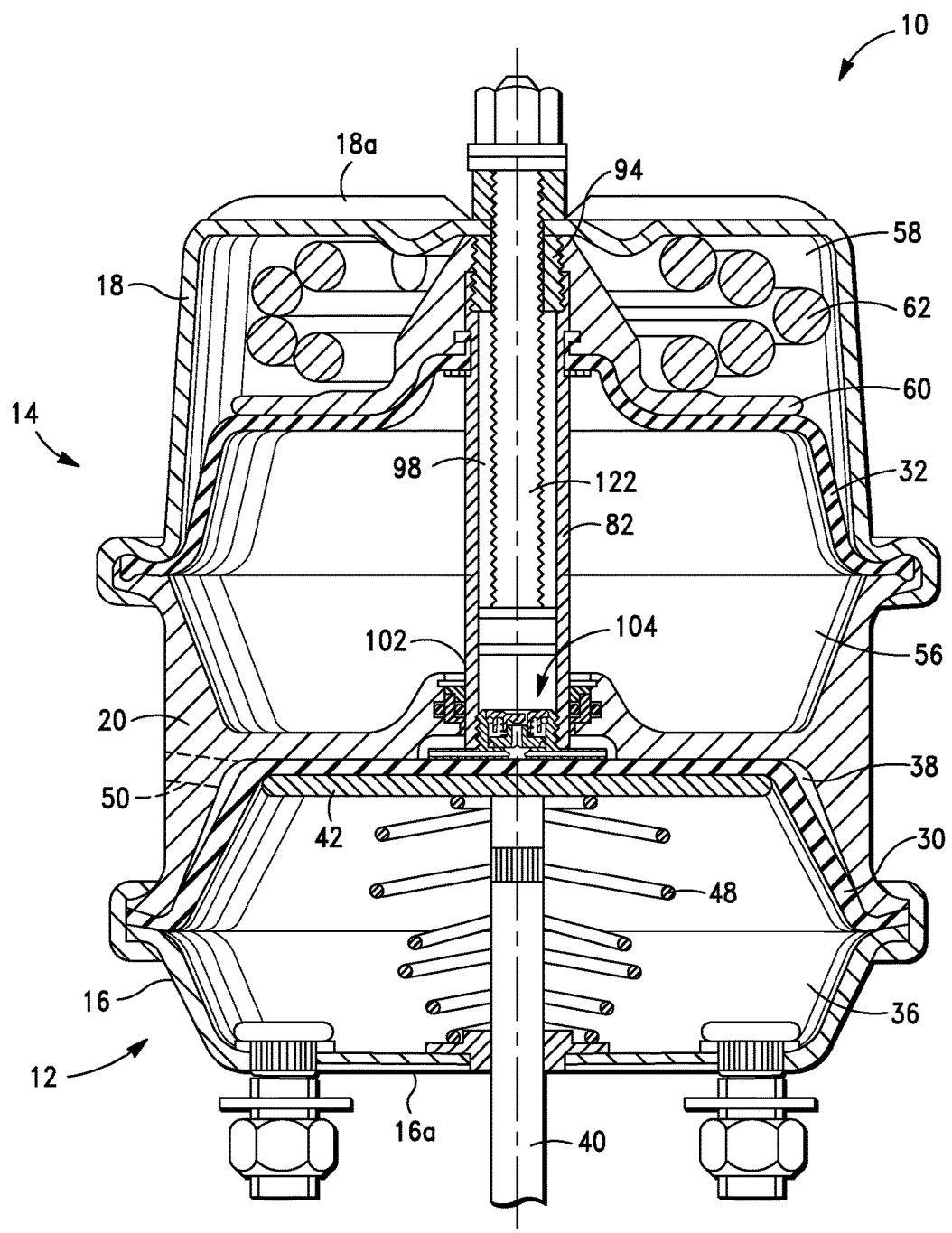
FIG. 2 is a cross-sectional view of the brake actuator of FIG. 1 showing the caging bolt in an extended position.
Figure 4:
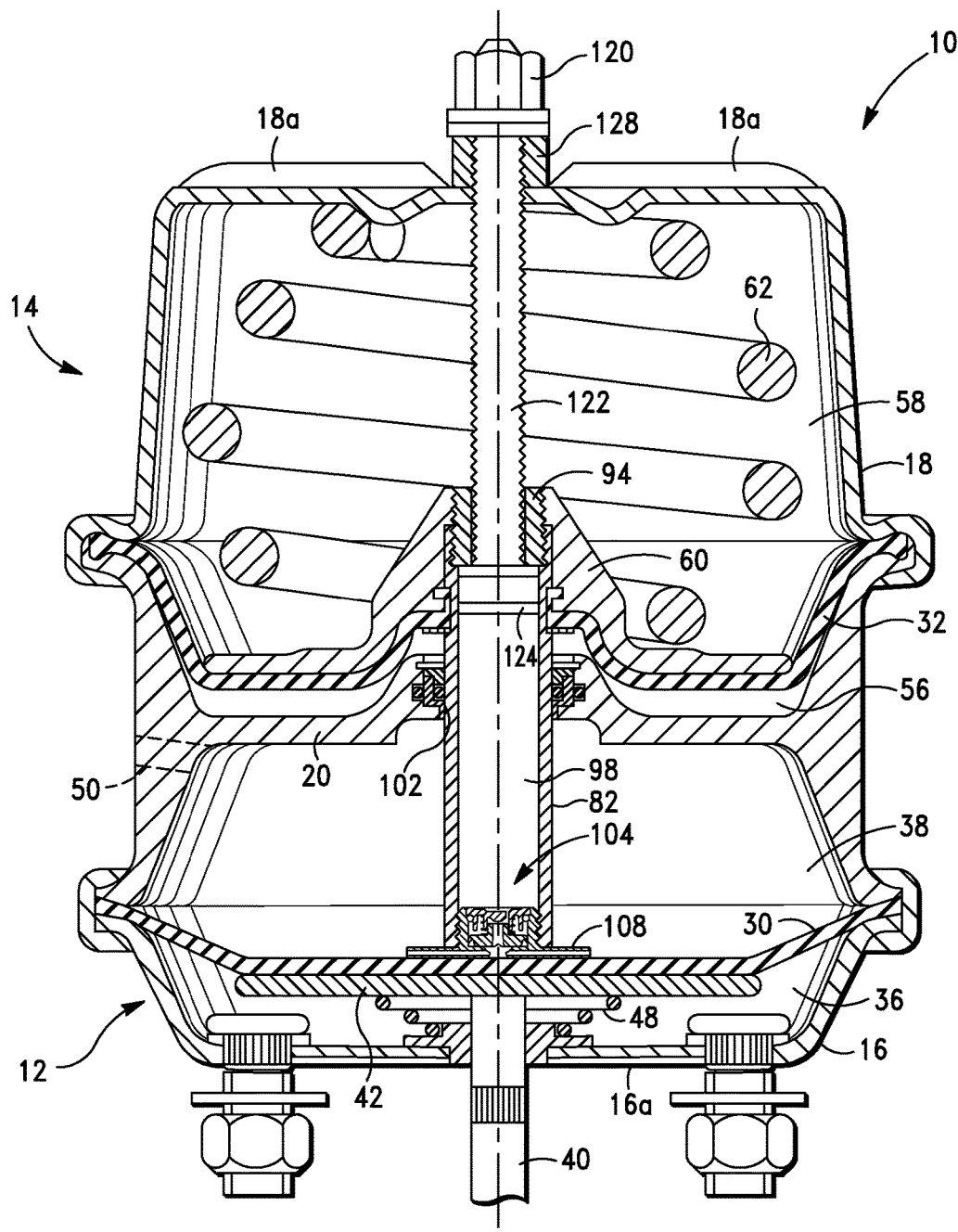
FIG. 4 is a cross-sectional view of the brake actuator of FIG. 1 showing the spring brake actuator applied.

In operation, the spring brake actuator 14 is moveable between the engaged position shown in FIG. 4 and the disengaged position shown in FIG. 2. When the vehicle on which brake actuator 10 is installed is parked for an extended period of time, the spring brake actuator 14 is typically in the engaged position shown in FIG. 4. In the engaged position, pressure is released from the spring brake pressure chamber 56 so that the compression spring 62 pushes the pressure plate 60 and the diaphragm 32 toward the adapter housing 20. As a result, the actuator tube 82 connected to the pressure plate 60 is pushed through the opening 102 in the adapter housing 20, and the transfer plate 108 of the control valve 104 forces the diaphragm 30 and pressure plate 42 toward the end wall 16a of the service brake actuator housing 16. This forces the majority of pushrod 40 out of the housing 16 and actuates the vehicle's parking or emergency brakes. When the spring brake actuator 14 is in the engaged position shown in FIG. 4, the vehicle on which the brake actuator 10 is installed cannot move. To allow the vehicle to move, the spring 62 must be retracted either by pressurizing the spring brake pressure chamber 56, as shown in FIG. 2, or by mechanically retracting the spring 62 with caging bolt 122, as shown in FIG. 1 and described above. Mechanical retraction of spring 62 with caging bolt 122 is typically only necessary during assembly of the brake actuator 10 and/or when mechanical release of the actuator 10 is necessary due to a failure or absence of the compressed air system.

When spring brake pressure chamber 56 is pressurized, diaphragm 32 and pressure plate 60 retract spring 62 and compress it against housing wall 18a to move the spring brake actuator 14 to its disengaged position, as shown in FIG. 2. The movement of pressure plate 60 causes actuator tube 82 to retract upward through opening 102 in adapter housing 20 thereby releasing pressure on diaphragm 30 and pressure plate 42. Spring 48 then biases pressure plate 42 and pushrod 40 to the position shown in FIG. 2 in which the vehicle's parking brakes are released. Bearing 94 allows the pressure plate 60 and actuator tube 82 to move with respect to the caging bolt 122 from the position shown in FIG. 2 to the position shown in FIG. 4 while preventing damage to the pressure plate 60, actuator tube 82, and caging bolt 122. The inner surface 97 of the bearing 94 is in close contact with the threads of the caging bolt to guide movement of the pressure plate 60 and actuator tube 82. The inner surface 97 of the hearing 94 is preferably relatively smooth to minimize damage to the threads of the caging bolt 122.

Figure 3:
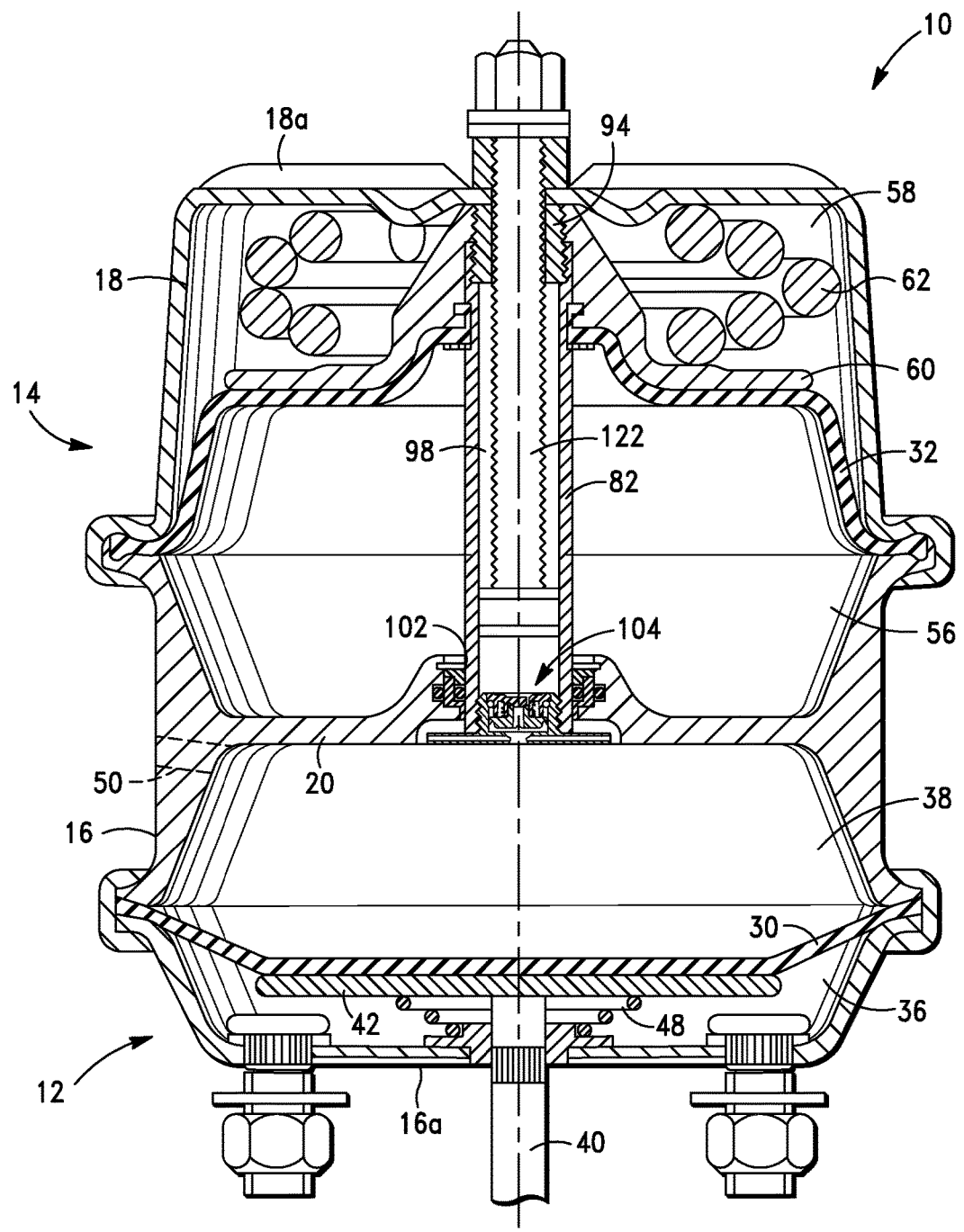
FIG. 3 is a cross-sectional view of the brake actuator of FIG. 1 showing the service brake actuator applied.

When the spring brake actuator 14 is in the disengaged position shown in FIGS. 2 and 3 and the vehicle on which the brake actuator 10 is installed is in transit, the service brake actuator 12 is utilized to brake the vehicle. The service brake actuator 12 moves between the disengaged position shown in FIG. 2 and the engaged position shown in FIG. 3. When in the disengaged position shown in FIG. 2, the pushrod 40 is retracted to a position that does not actuate the vehicle's brakes. To actuate the vehicle's service brakes, air enters the service brake pressure chamber 38 through inlet port 50. As the pressure in chamber 38 builds it forces diaphragm 30, pressure plate 42, and pushrod 40 toward end wall 16a into the position shown in FIG. 3 thereby overcoming spring 48 and actuating the vehicle's service brakes.

The spring brake actuator 200 shown in FIG. 6 operates in substantially the same manner as the spring brake actuator 14. The only difference is that the spring brake actuator 200 has a moveable piston 202 instead of the moveable diaphragm 32 and pressure plate 60 of actuator 14.

It is within the scope of the present invention for the connection structure of the diaphragm 32, actuator tube 82, bearing 94 and pressure plate 60 to differ from that described above and shown in FIG. 5 depending upon the particular design of the spring brake actuator 14. It is also within the scope of the invention for any type of divider to divide the spring brake pressure chamber 56 and spring chamber 58 instead of the diaphragm 32 and pressure plate 60 shown in FIGS. 1-5 or the piston 202 shown in FIG. 6.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A pneumatic brake actuator, comprising:
   a housing comprising first and second end walls and a side wall joined with and extending between said end walls, wherein said first end wall presents an opening;
   a divider that divides said housing into a spring chamber positioned between said divider and said first end wall and a pressure chamber positioned between said divider and said second end wall, wherein said divider comprises a peripheral edge that engages said side wall of said housing and said divider presents an opening surrounded by an interior surface;
   a spring positioned in said spring chamber;
   an actuator tube comprising a side wall that encloses an interior space, wherein an end of said actuator tube is positioned within said opening in said divider;
   a bearing that is positioned within said opening in said divider, wherein said bearing is joined to both said divider and to said actuator tube with a securement element comprising at least one of threads and weld material, wherein said bearing is in direct contact with said actuator tube, wherein said bearing is directly joined to said actuator tube, and wherein said bearing presents an opening that is aligned with said opening in said first end wall; and
   a caging bolt comprising a first end positioned within said interior space of said actuator tube, wherein said caging bolt extends from said first end through said opening in said bearing and said opening in said first end wall to a second end positioned outside of said housing, and wherein said caging bolt is coupled with said first end wall.

2. The brake actuator of claim 1, wherein said bearing comprises an outer surface and an inner surface surrounding said opening in said bearing, wherein said side wall of said actuator tube comprises inner and outer surfaces, and wherein said outer surface of said bearing is joined to said interior surface of said divider and said inner surface of said actuator tube.

3. The brake actuator of claim 2, wherein said interior surface of said divider comprises a first portion that is joined to said outer surface of said bearing, a second portion that is adjacent to said outer surface of said actuator tube, and a shoulder that is positioned between said first and second portions and that abuts said end of said actuator tube.

4. The brake actuator of claim 2, wherein said outer surface of said bearing comprises threads that engage threads formed in said interior surface of said divider and threads formed in said inner surface of said actuator tube.

5. The brake actuator of claim 2, wherein said outer surface of said bearing comprises threads that engage threads formed in said interior surface of said divider, and said outer surface of said bearing is welded to said inner surface of said actuator tube.

6. The brake actuator of claim 2, wherein said outer surface of said bearing is welded to said interior surface of said divider and said inner surface of said actuator tube.

7. The brake actuator of claim 1, wherein said divider comprises:
   a diaphragm comprising said peripheral edge and an interior edge surrounding an opening, wherein said diaphragm divides said housing into said spring chamber and said pressure chamber; and
   a pressure plate positioned between said diaphragm and said spring, wherein said pressure plate presents said opening of said divider surrounded by said interior surface, and wherein said interior edge of said diaphragm is coupled to said interior surface of said pressure plate.

8. The brake actuator of claim 1, wherein said divider comprises a piston.

9. The brake actuator of claim 1, wherein said first end of said caging bolt comprises a head that is larger than said opening in said bearing.

10. The brake actuator of claim 1, wherein said divider and actuator tube are moveable between a disengaged position when said pressure chamber is pressurized with fluid and an engaged position when said pressure chamber is exhausted, and wherein said spring biases said divider and actuator tube toward the engaged position.

11. The brake actuator of claim 1, wherein said housing comprises a spring brake actuator housing, and further comprising a service brake actuator comprising:
   a service brake actuator housing comprising first and second end walls and a side wall joined with and extending between said end walls, wherein said second end walls of said spring and service brake actuator housings are joined, and wherein there are aligned openings in said second end walls that said actuator tube extends through;
   a diaphragm comprising a peripheral edge that engages said side wall of said service brake actuator housing, wherein said diaphragm divides said service brake actuator housing into a service brake pressure chamber positioned between said diaphragm and said second end wall and a pushrod chamber positioned between said diaphragm and said first end wall; and
   a pushrod extending through an opening in said first end wall of said service brake actuator housing and comprising a first end positioned in said pushrod chamber and a second end, wherein said diaphragm and said pushrod are moveable between a service brake engaged position when said service brake pressure chamber is pressurized with fluid and a service brake disengaged position when said service brake pressure chamber is exhausted.

12. The brake actuator of claim 1, wherein said housing comprises a cover comprising said first end wall and a portion of said side wall and an adapter housing comprising said second end wall and a portion of said side wall.

13. The brake actuator of claim 1, wherein the bearing is directly joined to the divider.

14. A pneumatic brake actuator, comprising:
a housing;
a divider dividing the housing into a pressure chamber and a spring chamber, wherein the divider presents an opening surrounded by an interior surface;
an actuator tube that abuts the divider, wherein the actuator tube comprises an inner surface; and
a bearing comprising an outer surface that is joined to the interior surface of said divider, wherein said bearing is in direct contact with said actuator tube, wherein said bearing is directly joined to the inner surface of said actuator tube, and wherein said bearing is joined to both said divider and to said actuator tube with a securement element comprising at least one of threads and weld material.

15. The brake actuator of claim 14, wherein said divider comprises a piston.

16. The brake actuator of claim 15, wherein the piston comprises a side wall that is integral with an end wall, wherein the opening is a central opening in the end wall that surrounds the interior surface, wherein the actuator tube abuts the end wall of the piston, and wherein the inner surface of the actuator tube aligns with the interior surface.

17. The brake actuator of claim 14, wherein said bearing comprises threads that engage threads on said divider and threads on said actuator tube.

18. The brake actuator of claim 14, wherein said bearing comprises threads that engage threads on said divider, and said bearing is welded to said actuator tube.

19. The brake actuator of claim 14, wherein said bearing is welded to said divider and to said actuator tube.

20. The brake actuator of claim 14, wherein the housing comprises a cover coupled to an adapter housing.

21. The brake actuator of claim 20, further comprising a spring positioned within the spring chamber between the divider and the cover.

22. The brake actuator of claim 21, wherein the actuator tube is hollow and comprises an end received by said opening in said divider.

23. The brake actuator of claim 22, wherein the bearing is at least partially received by said opening in said divider.

24. The brake actuator of claim 23, further comprising a caging bolt comprising a first end positioned within said actuator tube and a second end positioned outside of said housing, wherein said caging bolt extends through openings in said bearing and said cover.

25. The brake actuator of claim 21, wherein said divider comprises:
a diaphragm comprising a peripheral edge sealed between said cover and said adapter housing and an interior edge surrounding an opening that receives said actuator tube; and
a pressure plate positioned between said diaphragm and said spring, wherein said pressure plate presents said opening surrounded by said interior surface.

26. The brake actuator of claim 14, wherein the bearing is directly joined to the divider.

27. A pneumatic brake actuator, comprising:
a housing;
a divider dividing the housing into a pressure chamber and a spring chamber, wherein the divider presents an opening surrounded by an interior surface;
an actuator tube that abuts the divider, wherein the actuator tube comprises an inner surface at least a portion of which is aligned with at least a portion of the interior surface of the divider; and
a bearing comprising a cylindrical outer surface that is in direct contact with and is directly joined to each of the aligned portions of the inner surface of the actuator tube and the interior surface of the divider, wherein the bearing is joined to both the divider and to the actuator tube with a securement element comprising at least one of threads and weld material.

28. The pneumatic brake actuator of claim 27, wherein the interior surface of the divider comprises a first portion that is joined to the outer surface of the bearing, a second portion that is adjacent to the outer surface of the actuator tube, and a shoulder that is positioned between the first and second portions and that abuts the end of the actuator tube.

29. The pneumatic brake actuator of claim 27, wherein the divider comprises a piston.

30. The pneumatic brake actuator of claim 27, wherein the housing comprises a cover coupled to an adapter housing, and further comprising a spring positioned within the spring chamber between the divider and the cover.

31. The pneumatic brake actuator of claim 30, wherein the divider comprises:
a diaphragm comprising a peripheral edge sealed between the cover and the adapter housing and an interior edge surrounding an opening that receives the actuator tube; and
a pressure plate positioned between the diaphragm and the spring, wherein the pressure plate presents the opening surrounded by the interior surface.

32. The pneumatic brake actuator of claim 27, further comprising a caging bolt comprising a first end positioned within said actuator tube and a second end positioned outside of said housing, wherein said caging bolt extends through openings in said bearing and said housing.

* * * * *